Oct. 9, 1923.
V. R. WILLOUGHBY
CAM SHEAVE FOR BRAKES
Filed Aug. 29, 1921
1,470,414
2 Sheets-Sheet 2
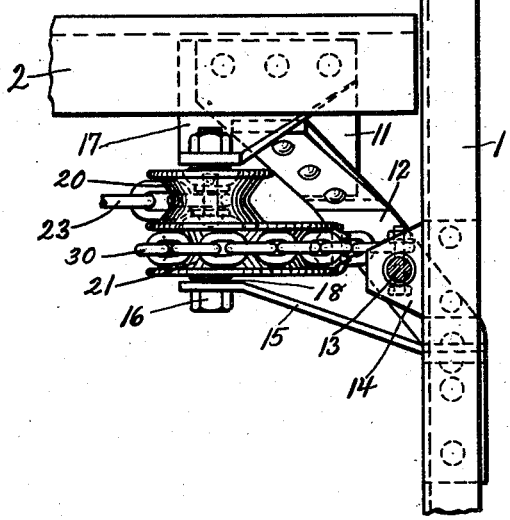
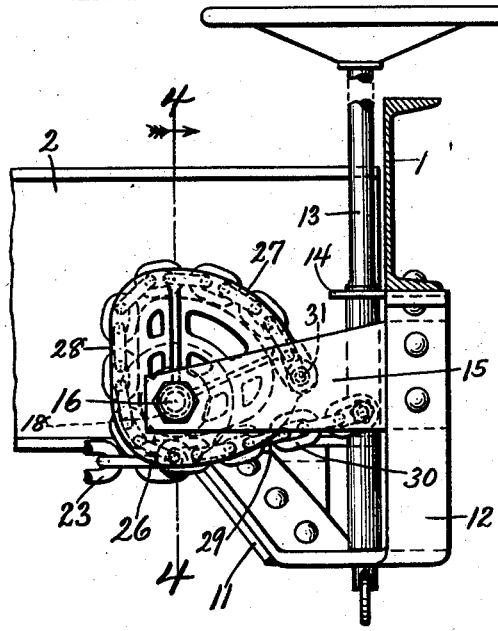
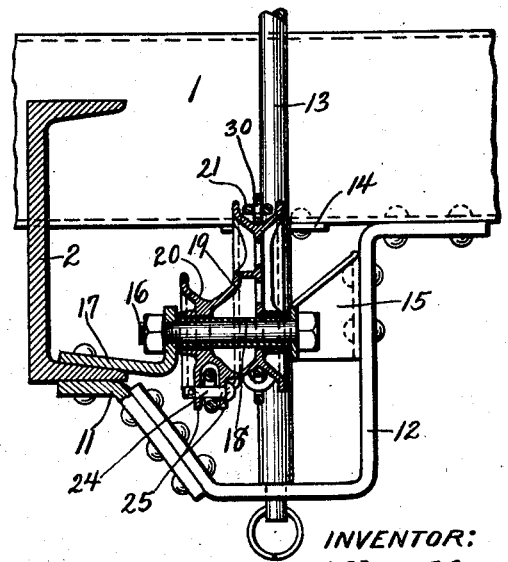
INVENTOR:
Victor R. Willoughby
BY J. H. Gibbs
ATTORNEY.

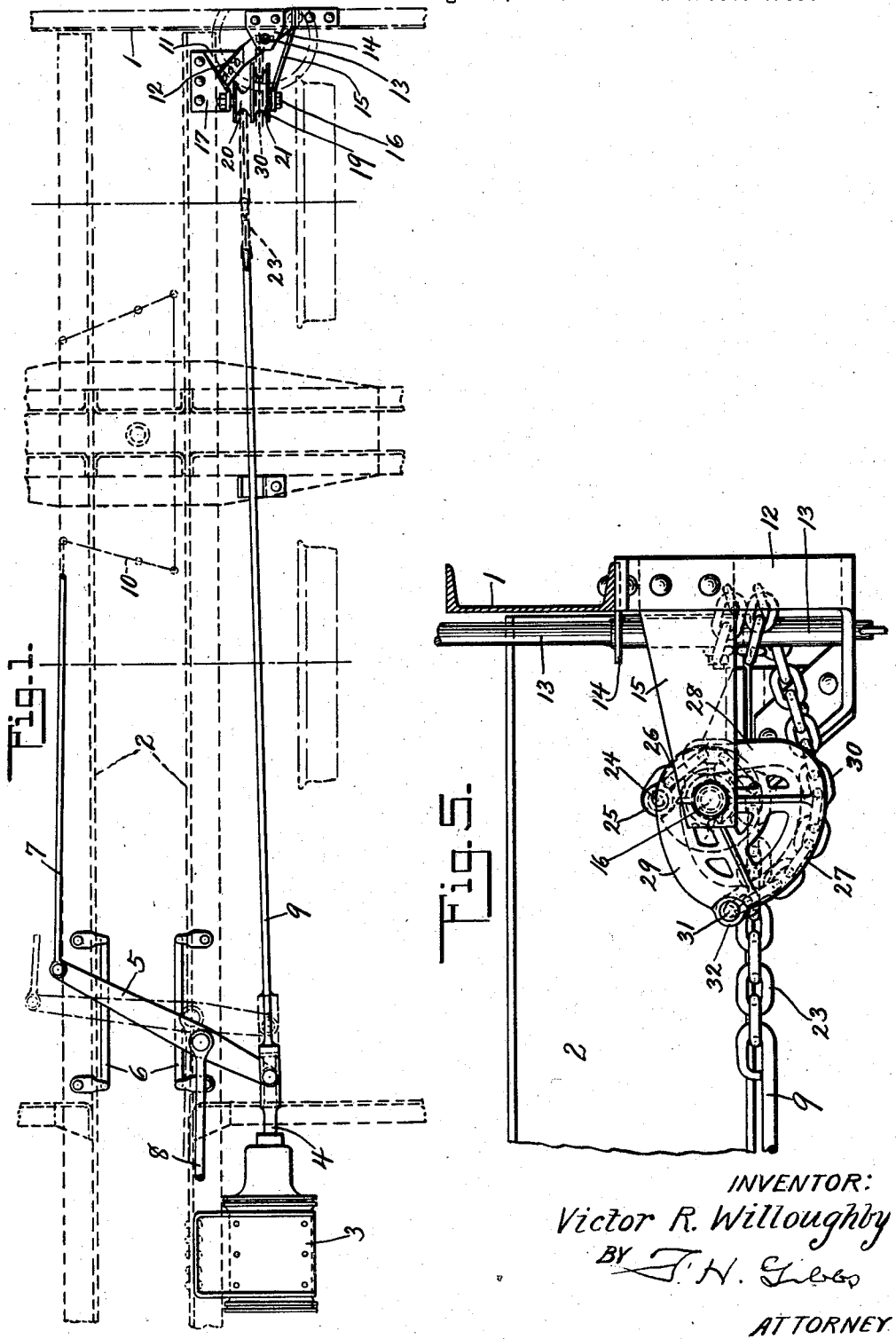

Patented Oct. 9, 1923.

1,470,414

UNITED STATES PATENT OFFICE.

VICTOR R. WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

CAM SHEAVE FOR BRAKES.

Application filed August 29, 1921. Serial No. 496,443.

*To all whom it may concern:*

Be it known that I, VICTOR R. WILLOUGHBY, residing at Ridgewood, Bergen County, New Jersey, and being a citizen of the United States, have invented certain new and useful Improvements in a Cam Sheave for Brakes, of which the following is a full, clear, and exact description, such as will enable others skilled in the art to which it appertains to make and to use the same, reference being had to the accompanying drawings, which illustrate the preferred form of the invention; though it is to be understood that the invention is not limited to the exact details of construction shown and described, as it is obvious that various modifications thereof within the scope of the claims will occur to persons skilled in the art.

In said drawings:

Fig. 1 is a plan view of my improved car brake mechanism, the car frame being shown in dotted lines;

Fig. 2 is an enlarged view of a portion of Fig. 1 showing the manner of supporting the brake from the car sills;

Fig. 3 is a view in elevation of the structure shown in Fig. 2, the car end sill being shown in section, with the brake in the released position;

Fig. 4 is a section taken on the line 4—4 of Fig. 3; and

Fig. 5 is a view similar to Fig. 3 with the brake in the applied position.

It is an object of my invention to provide an improved brake mechanism and it is also an object of my invention to provide an improved cam sheave for a brake mechanism adapted to operate at one lever ratio while the shoes are being moved to engage with the wheels and to operate at another lever ratio thereafter.

In the embodiment of my invention shown in the drawings the car floor frame comprises an end sill 1 and center sills 2 upon which is mounted a brake cylinder 3 having a push rod 4 adapted to operate a brake lever 5 supported on guides 6 carried by the center sills 2. To the brake lever 4 are connected the brake rods 7 and 8 and an operating rod 9, the brake rods 7 and 8 being connected to a suitable truck brake mechanism 10, shown diagrammatically in Fig. 1.

Attached to one of the center sills 2 is an angle member 11 to which is secured one end of a stirrup 12 which has its other end connected to the end sill 1. A brake staff 13 is mounted on the stirrup 12 and projects through a guide member 14 attached to the end sill 1. Secured to the stirrup 12 is a projecting arm 15 which serves to support one end of a bolt 16, the other end of which is supported by an angle member 17 connected to a center sill 2. The bolt 16 is provided with a tubular sleeve 18 and serves as an axle for a cam sheave 19.

The cam sheave 19 comprises a plurality of winding faces 20 and 21, the winding face 20 being circular with its center lying in the axis of the bolt 16 and adapted to receive a single turn of a chain 23 that is connected to the rod 9 and secured to the sheave 19 by a pin 24 passing through the lugs 25 on the sheave 19. The diameter of the winding face 20 is such that in a single turn it will wind sufficient chain to cause a full movement of the lever 5. The face 21 has two circular portions 26 and 27 connected by portions 28 and 29, the radius of the portion 26 being substantially the same as the radius of the face 20. The face 21 is adapted to receive a single turn of a chain 30 connected to the brake staff 13 and secured to the sleeve 19 by a pin 31 passing through the lugs 32. As shown in Fig. 3 the pin 31 is so positioned that in the released position of the sheave 19 the chain engages substantially the entire face 21 and upon rotation of the brake staff 13 to apply the brakes the sheave 19 will be rotated the chain 30 being unwound from the face 21 and the chain 23 being wound upon the face 20. For the first part of the operation, the winding and unwinding take place at substantially equal rates as the effective parts of the winding faces have equal radii and thereafter the effective radius of the face 21 will be increased over that of the face 20. The first part of the operation is designed to give a quick movement of the shoes to the wheels and is sufficient to bring new brake shoes into contact with the wheels.

The shoes exert pressure on the wheels only after the cam sheave 19 has reached the position, shown in Fig. 5, in which the chain is being unwound from the portion 27 and the effective lever ratio of the sheave has been increased to its maximum.

What I claim is:

1. A plurality of sills, a brake lever, a brake staff, a stirrup carried by said sills adapted to support said staff, means connecting said lever and said staff comprising a power multiplying sheave and means connected to said sills and stirrup, adapted to support said sheave.

2. The combination of center and end sills, a stirrup connecting said sills, a brake staff carried by said stirrup, a power multiplying sheave connected to said center sill, a power connection between said staff and sheave and a strut between said sheave and stirrup.

3. The combination of car sills, a stirrup connecting said sills, a brake staff carried by said stirrup, a power multiplying sheave operated by said staff and supported from one of said sills and a strut connecting said sheave and stirrup.

4. The combination of car framing members, a stirrup connecting said framing members, a brake staff mounted on said stirrup, a power multiplying sheave operated by said staff and connected to one of said framing members and a strut connecting said sheave to the stirrup.

In witness whereof I have hereunto set my hand in the presence of two witnesses.

VICTOR R. WILLOUGHBY.

Witnesses:
ADOLPH KASSLER,
R. W. SMITH.